United States Patent [19]

Satomura

[11] Patent Number: 5,400,309

[45] Date of Patent: Mar. 21, 1995

[54] DATA RECORDING AND/OR REPRODUCING METHOD AND APPARATUS

[75] Inventor: Seiichiro Satomura, Yokohama, Japan

[73] Assignee: Canon Kabushiki Kaisha, Tokyo, Japan

[21] Appl. No.: 83,444

[22] Filed: Jun. 29, 1993

[30] Foreign Application Priority Data

Jun. 30, 1992 [JP] Japan .................................. 4-196133

[51] Int. Cl.6 .............................................. G11B 7/085
[52] U.S. Cl. ........................................ 369/32; 369/47; 369/48
[58] Field of Search ...................... 369/47, 48, 32, 49; 360/18, 21, 20, 43, 50, 51

[56] References Cited

U.S. PATENT DOCUMENTS

| | | | |
|---|---|---|---|
| 5,138,599 | 8/1992 | Fukushima et al. | 369/32 |
| 5,175,654 | 12/1992 | Saito et al. | 360/51 |
| 5,182,740 | 1/1993 | Mizokami et al. | 369/47 |
| 5,210,733 | 5/1993 | Yamaguchi et al. | 369/32 |
| 5,278,703 | 1/1994 | Rub et al. | 369/32 |

FOREIGN PATENT DOCUMENTS 0461912  12/1991  European Pat. Off. .

OTHER PUBLICATIONS

Patent Abstracts of Japan, Abstract of Japanese Patent No. JP-A-2,023,552, vol. 14, No. 167, (p. 1031) Publication Date: Mar. 30, 1990.

Primary Examiner—Georgia Y. Epps
Assistant Examiner—Tan Dinh
Attorney, Agent, or Firm—Fitzpatrick, Cella, Harper & Scinto

[57] ABSTRACT

A method and apparatus is provided for reproducing data using a disc-like recording medium having a plurality of zones divided radially thereof. Different frequencies are set for the zones each of which includes a plurality of data blocks disposed in a predetermined order. A signal with the set frequency is recorded on the data blocks in the respective zone. The data blocks are scanned by a head to read out the recorded signal while moving the head radially over the recording medium. A clock generating circuit generates a clock signal with a frequency set for the zone to which the data block being scanned by the head belongs. The data is reproduced from the signal read out by the head using a reproduction circuit, on the basis of the clock signal. When the head reads out the signals over two continuous zones, the head position of the last data block of the zone from which the signals are read out earlier is detected and a detection signal is outputted. In response to the detection signal, a control circuit instructs the clock generating circuit to change the frequency of the clock signal.

19 Claims, 16 Drawing Sheets

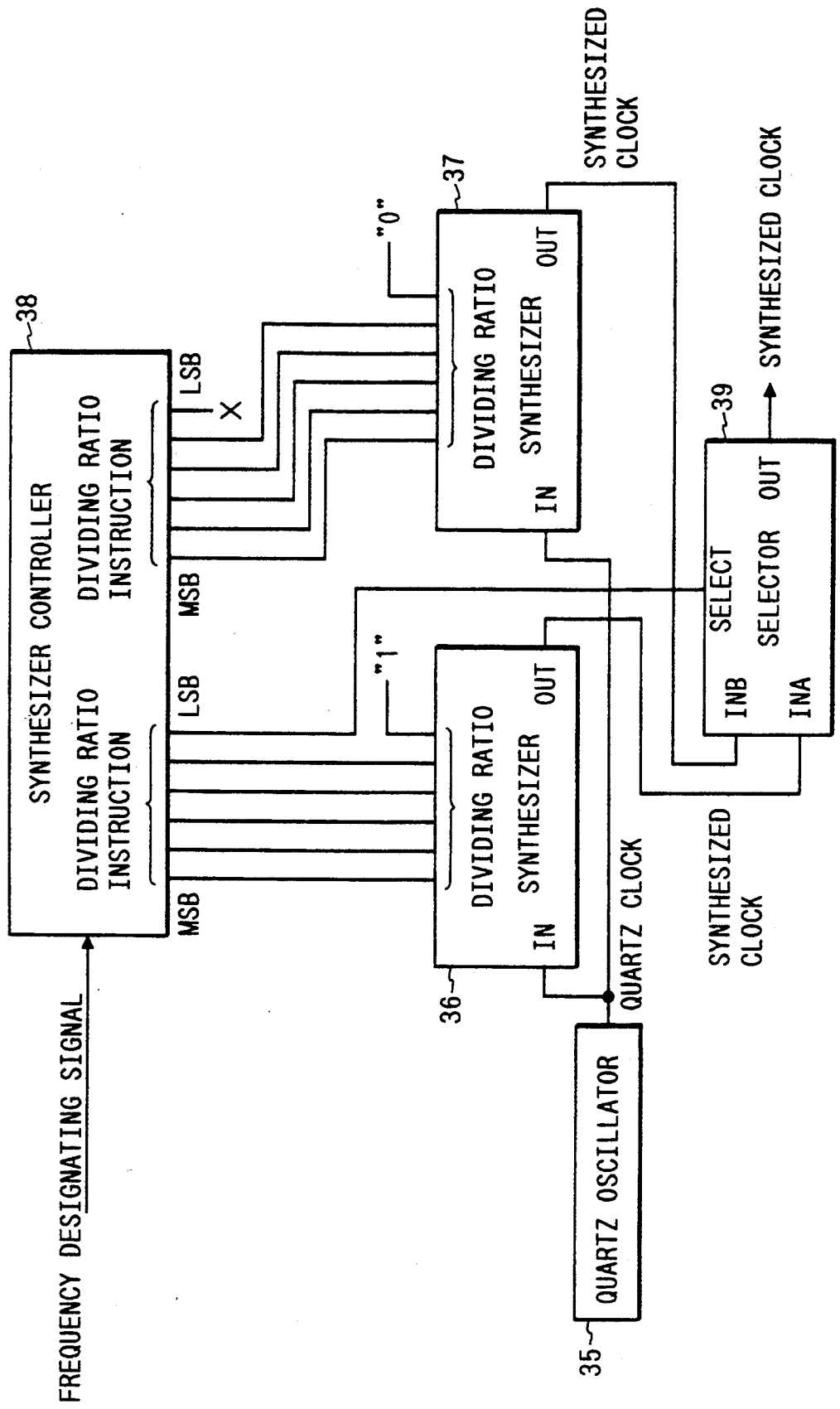

FIG. 14

| NUMBER OF SECTORS PER TRACK | INSTRUCTION VALUE FOR DIVIDING RATIO FOR SYNTHESIZER 36 | DIVIDING RATIO OF SYNTHESIZER 36 | INSTRUCTION VALUE FOR DIVIDING RATIO FOR SYNTHESIZER 37 | DIVIDING RATIO OF SYNTHESIZER 37 | SELECT SIGNAL OF LSB | SELECTION OF SELECTOR 39 | DIVIDING RATIO OF SELECTED SYNTHESIZED CLOCK |
|---|---|---|---|---|---|---|---|
| 20 | 20 | 21 | 21 | 20 | 0 | SYNTHESIZER 37 | 20 |
| 21 | 21 | 21 | 22 | 22 | 1 | SYNTHESIZER 36 | 21 |
| 22 | 22 | 23 | 23 | 22 | 0 | SYNTHESIZER 37 | 22 |
| 23 | 23 | 23 | 24 | 24 | 1 | SYNTHESIZER 36 | 23 |
| 24 | 24 | 25 | 25 | 24 | 0 | SYNTHESIZER 37 | 24 |
| ... | ... | ... | ... | ... | ... | ... | ... |

INNER → OUTER

FIG. 15

| | NUMBER OF SECTORS PER TRACK | INSTRUCTION VALUE FOR DIVIDING RATIO FOR SYNTHESIZER 36 | DIVIDING RATIO OF SYNTHESIZER 36 | INSTRUCTION VALUE FOR DIVIDING RATIO FOR SYNTHESIZER 37 | DIVIDING RATIO OF SYNTHESIZER 37 | SELECT SIGNAL OF LSB | SELECTION OF SELECTOR 39 | DIVIDING RATIO OF SELECTED SYNTHESIZED CLOCK |
|---|---|---|---|---|---|---|---|---|
| OUTER | 40 | 39 | 39 | 40 | 40 | 1 | SYNTHESIZER 37 | 40 |
| ↓ | 39 | 38 | 39 | 39 | 38 | 0 | SYNTHESIZER 36 | 39 |
| | 38 | 37 | 37 | 38 | 38 | 1 | SYNTHESIZER 37 | 38 |
| | 37 | 36 | 37 | 37 | 36 | 0 | SYNTHESIZER 36 | 37 |
| INNER | 36 | 35 | 35 | 36 | 36 | 1 | SYNTHESIZER 37 | 36 |
| | ... | ... | ... | ... | ... | ... | ... | ... |

DATA RECORDING AND/OR REPRODUCING METHOD AND APPARATUS

BACKGROUND OF THE INVENTION

1. Field of the Invention

This invention relates to a method of and an apparatus for recording and/or reproducing data on or from a disc-like recording medium having a plurality of zones divided radially thereof.

2. Related Background Art

When information is to be recorded on or reproduced from rotating a disc-like recording medium, if the rotational velocity is constant, the recording density becomes rougher on the outer periphery of the recording medium because the recording density differs at the inner periphery compared with the outer periphery of the recording medium, and thus, considerable waste is caused by the lack of the effective utilization of the recording region of the recording medium. So, as a solution to this problem, there is known, for example, a modified constant angular velocity (MCAV) system, whereby a recording medium is rotated at a constant velocity and the recording-reproduction frequency is made higher on the outer periphery thereof. This system is also called the zone constant angular velocity (ZCAV) system. In such an MCAV system, the recording region of the recording medium is radially divided into a plurality of zones, and the recording-reproduction frequency is switched in the different zones. Accordingly, as the format of the recording medium, the number of sectors per track becomes greater on the outer peripheral tracks as shown in FIG. 1 of the accompanying drawings, and when the recording medium is rotated at a constant velocity the, information transfer speed becomes higher on at outer periphery.

Now, when the recording-reproduction frequency is to be switched for each zone, the clock frequency of a synthesizer is switched, but a predetermined time is required for the switching of the frequency of the synthesizer and some time is necessary before the frequency settles down at a target frequency. That is, as shown in FIG. 2 of the accompanying drawings, the synthesizer has a frequency switching response characteristic, and to switch the frequency from a first frequency of a certain zone to a second frequency of the next zone, a time T is necessary. This switching time T is related to jitter of a clock, and if an attempt is made to shorten the time T, the amount of jitter of the clock will become great and thus, there is a limit to the shortening of the switching time. The switching time T for the frequency, when converted into the amount of data of the disc, corresponds to a length approximate to one sector. Therefore, heretofore, it has been difficult to continuously record or reproduce data over two zones, and when data is to be recorded or reproduced over two zones, there has been adopted a technique of temporarily discontinuing recording or reproduction when the recording or reproduction on a zone is terminated, and waiting for one full rotation of the disc, and again starting recording or reproduction at the head of the next zone.

SUMMARY OF THE INVENTION

It is the object of the present invention to solve the above-noted problem peculiar to the prior art and to provide a data recording and/or reproducing method and apparatus in which the switching of the frequency of a clock signal is quickly effected when data recording and/or reproduction is to be effected over a plurality of zones of a disc-like recording medium.

To achieve the above object of the present invention, an apparatus is provided for reproducing data from a disc-like recording medium having a plurality of zones divided radially thereof, different frequencies being set for the zones, each of the zones comprising a plurality of data blocks arranged in a predetermined order, the data blocks in each of the zones having signals recorded at a set frequency thereon. The apparatus comprises:

a head for scanning the data blocks while moving radially over the medium, and reading out the recorded signals;

a clock generating circuit for generating a clock signal of a frequency set for the zone to which the data block being scanned by the head belongs;

a reproducing circuit for reproducing data from the signal read out by the head, on the basis of the clock signal generated by the clock generating circuit;

a detection circuit for detecting, when the head reads out the signals over two continuous zones, the head position of the last data block of the zone from which the signals are read out earlier, and outputting a detection signal; and a control circuit responsive to the detection signal output from the detection circuit to instruct the clock generating circuit to change the frequency of the clock signal.

Also, to achieve the above object of the present invention, a method of reproducing data from a disc-like recording medium is provided. The medium has first and second zones divided radially thereof, each of the first and second zones comprising a plurality of data blocks arranged in a predetermined order, the data blocks of the first and second zones having first and second signals recorded at first and second frequencies thereon, respectively. The method comprises the steps of:

scanning the data blocks of the first zone with a head while moving the head radially over the medium, and reading out the recorded first signal;

generating a clock signal of a first frequency from a clock generating circuit;

reproducing data from the first signal read out by the head, on the basis of the clock signal of the first frequency generated by the clock generating circuit;

detecting the head position of the last data block in the first zone, and obtaining a detection signal;

generating a clock signal of a second frequency from the clock generating circuit in response to the detection signal;

scanning the data blocks in the second zone and reading out the recorded second signal; and reproducing data from the second signal read out by the head, on the basis of the clock signal of the second frequency generated by the clock generating circuit.

To achieve the above object of the present invention, an apparatus is provided for recording and/or reproducing data on or from a disc-like recording medium having a plurality of zones divided radially thereof, different frequencies being set for the divided zones, each of the zones comprising a plurality of data blocks arranged in a predetermined order, the data blocks in each of the zones having signals recorded at a set frequency thereon, comprises. The apparatus comprises:

a head for scanning the data blocks while moving radially over the medium, and writing signals thereon and/or reading out signals therefrom;

a clock generating circuit for outputting a clock signal, the clock generating circuit comprising a first clock generator for generating a clock signal of a frequency set for one of the plurality of zones, a second clock generator for generating a clock signal of a frequency set for another one of the plurality of zones, and a selector for causing the clock signals generated from the first and second clock generators to be selectively output;

a signal processing circuit for converting data into a signal to be written by the head and/or reproducing data from the signal read out by the head, on the basis of the clock signal output from the clock generating circuit; and a control circuit for instructing the selector of the clock generating circuit to switch the clock signal when the head shifts from the data blocks in the zone currently being scanned thereby to the data blocks in another zone.

To achieve the above object of the present invention, a method is provided of reproducing data from a disk-like recording medium having first and second zones divided radially thereof, each of the first and second zones comprising a plurality of data blocks arranged in a predetermined order, the data blocks in the first and second zones having first and second signals recorded at first and second frequencies thereon, respectively, by the use of a data reproducing apparatus comprising a head and first and second clock generators. The method comprises the steps of:

generating a clock signal of a first frequency from the first clock generator;

generating a clock signal of a second frequency from the second clock generator;

scanning the data blocks in the first zone by the head while moving the head radially over the medium, and reading out the recorded first signal;

reproducing data from the first signal read out by the head, on the basis of the clock signal of the first frequency generated by the first clock generator;

scanning the data blocks in the second zone with the head and reading out the recorded second signal; and reproducing data from the second signal read out by the head, on the basis of the clock signal of the second frequency generated by the second clock generator.

To achieve the above object of the present invention, a method is provided of recording data from a disc-like recording medium having first and second zones divided radially thereof, each of the first and second zones comprising a plurality of data blocks arranged in a predetermined order, first and second frequencies being set for the data blocks in the first and second zones, by the use of a data recording apparatus comprising a head and first and second clock generators. The method comprises the steps of:

generating a clock signal of a first frequency from the first clock generator;

generating a clock signal of a second frequency from the second clock generator;

scanning the data blocks in the first zone by the head while moving the head radially over the medium, and writing a first signal thereon on the basis of the clock signal of the first frequency generated by the first clock generator; and scanning the data blocks in the second zone by the head, and writing a second signal thereon on the basis of the clock signal of the second frequency generated by the second clock generator.

BRIEF DESCRIPTION OF THE DRAWINGS

FIG. 13 is a block diagram showing an example of the construction of the clock generating circuit of FIG. 12.

FIG. 14 shows variations in the frequency of a clock signal from the outer periphery to the inner periphery of a disc in the apparatus of FIG. 12.

FIG. 15 shows variations in the frequency of a clock signal from the outer periphery to the inner periphery of the disc in the apparatus of FIG. 12.

DESCRIPTION OF THE PREFERRED EMBODIMENTS

Figure 1:
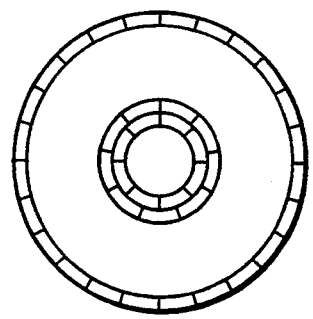
FIG. 1 is a schematic plan view showing the number of sectors per track on a disc-like recording medium of the MCAV type.
Figure 2:
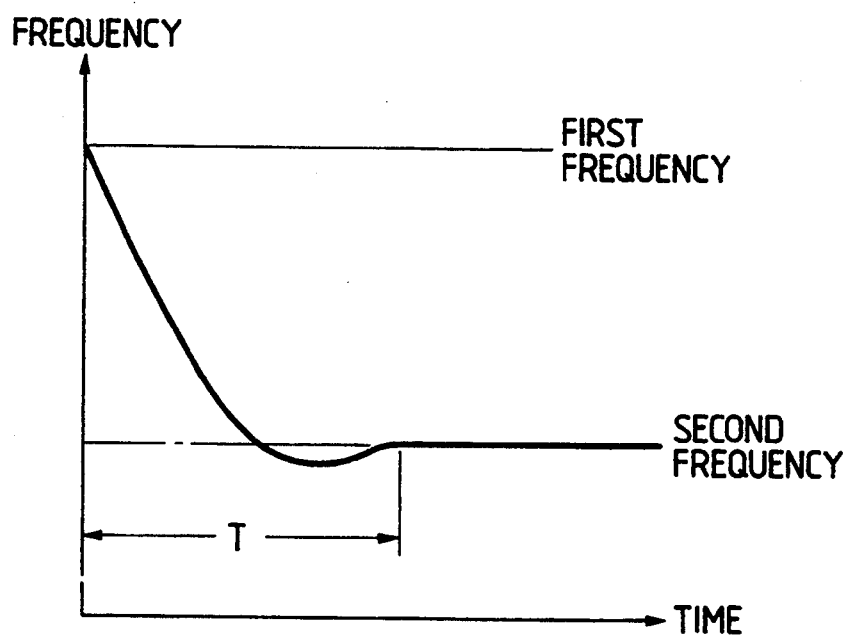
FIG. 2 shows the switching response characteristic of the clock frequency of a synthesizer according to the prior art.
Figure 3:
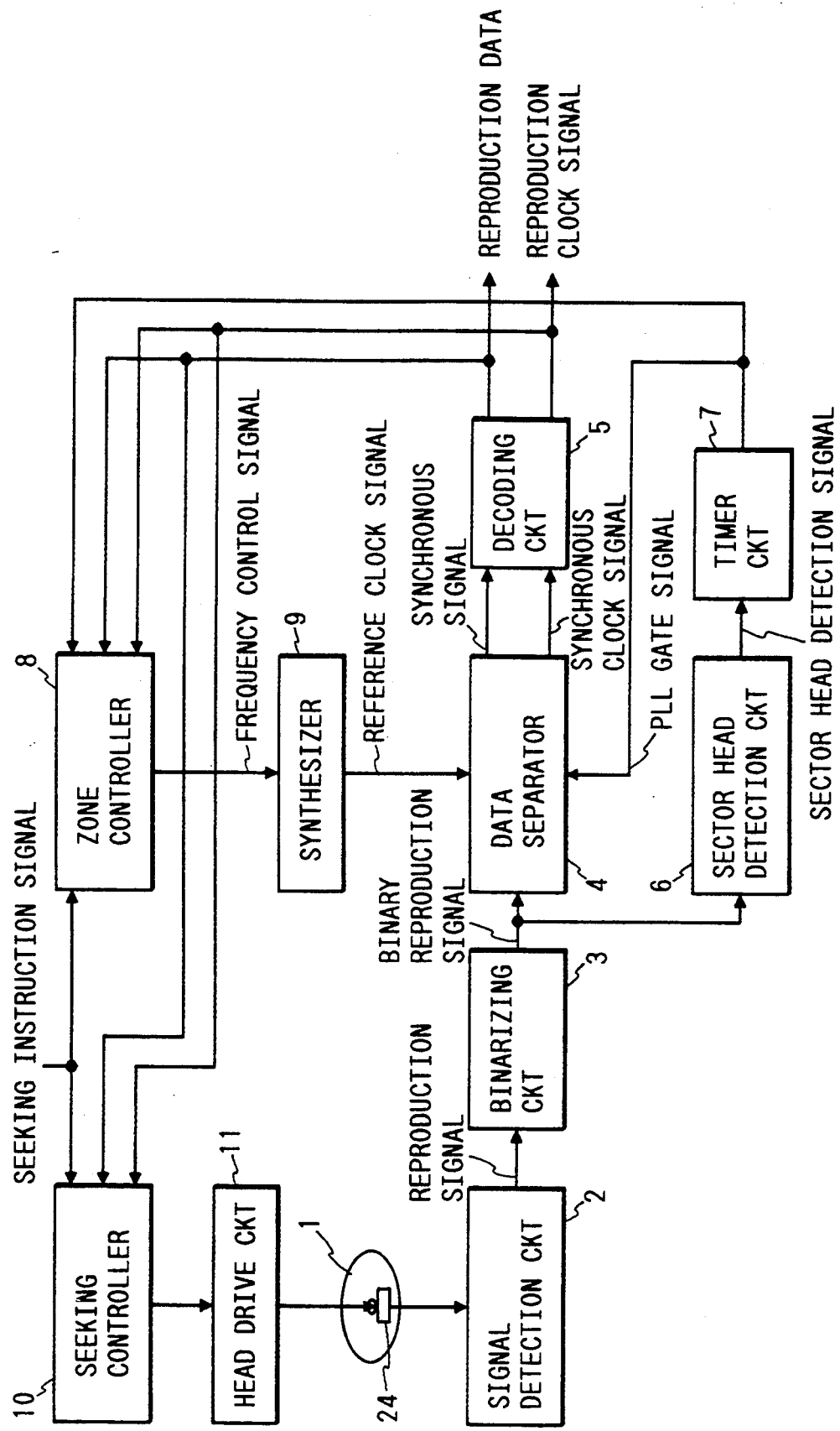
FIG. 3 is a block diagram showing a first embodiment of the data reproducing apparatus of the present invention.

Some embodiments of the present invention will hereinafter be described in detail with reference to the drawings. FIG. 3 is a block diagram showing a first embodiment of the data reproducing apparatus of the present invention. Data reproducing apparatus include those of the magnetic recording type and those of the optical recording type, but it is to be understood herein that the data reproducing apparatus of the present invention is an optical data reproducing apparatus. In FIG. 3, reference numeral 1 designates a disc-like recording medium such as an optical disc or a magneto-optical disc, and reference numeral 2 denotes a signal detection circuit for detecting reflected light from the recording medium and outputting a reproduction signal for recorded information. The recording region of the recording medium 1 is divided to be of a plurality of zones, and is formated into the so-called MCAV type. Reference numeral 3 designates a binarizing circuit for binarizing the reproduction signal reproduced by the signal detection circuit 2, reference numeral 4 denotes a data separator for synchronizing the binary signal, and reference numeral 5 designates a decoding circuit for decoding the synchronized signal. The signal decoded by the decoding circuit 5 is output as reproduction data and a reproduction clock signal. Reference numeral 6 denotes a sector head detection circuit for detecting the head of the sectors of the recording medium, and reference numeral 7 designates a timer circuit for counting a predetermined time with the sector detection signal as the starting point to thereby produce a PLL gate signal.

Reference numeral 8 denotes a zone controller for recognizing the current position of a recording-reproducing optical head 24 on the recording medium 1 and controlling a synthesizer 9 on the basis of the result of the recognition. To recognize the current position of the optical head, the zone controller reads the address data of the preformat portion of the recording medium 1 from the reproduction data obtained by the decoding circuit 5, thereby recognizing the current position of the optical head 24 on the recording medium 1. When the zone controller 8 controls the synthesizer 9, it outputs a frequency control signal corresponding to the zone to the synthesizer 9. For example, if the number of sectors per track is 20, the zone controller outputs a control signal corresponding to 20, and if the number of sectors per track is 30, the zone controller outputs a control signal corresponding to 30. The synthesizer 9 produces a reference clock signal corresponding to the zone in response to this frequency control signal, and outputs it to the data separator 4. Reference numeral 10 designates a seeking controller for controlling a head drive circuit 11 on the basis of a seeking instruction signal output from a main control portion, not shown, moving the optical head 24 radially over the medium and causing it to seek an indicated position. The seeking controller 10 moves the optical head to the indicated position on the basis of address data obtained by the decoding circuit 5.

Figure 4:
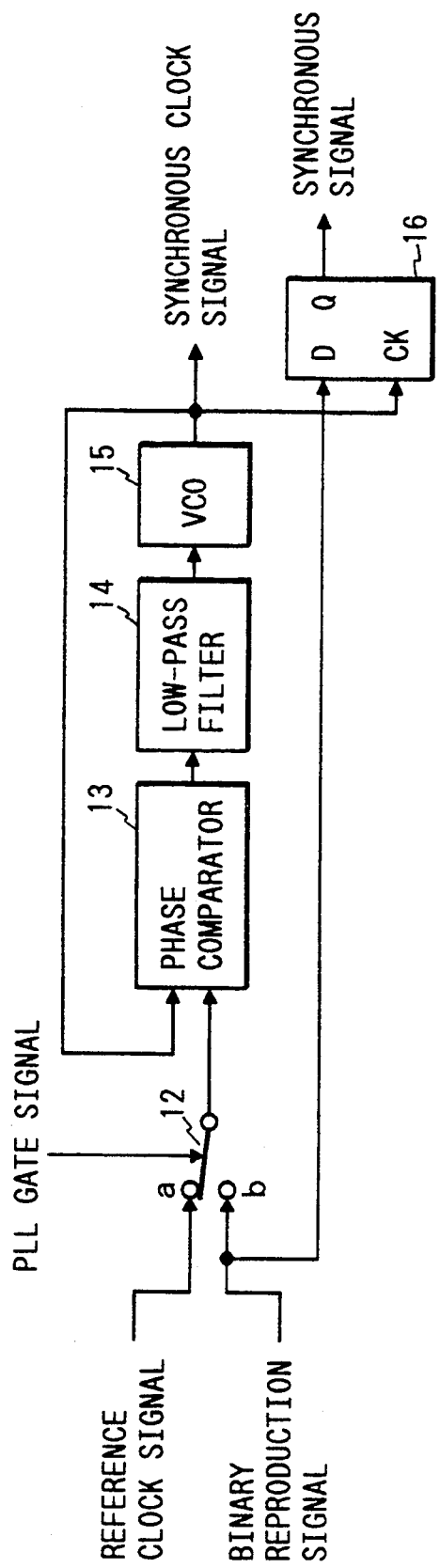
FIG. 4 is a block diagram showing an example of the construction of the data separator of FIG. 3.

FIG. 4 shows the detailed construction of the data separator 4. In this construction, use is made of a data separator using a PLL circuit. In FIG. 4, reference numeral 12 denotes a switch adapted to be changed over by the PLL gate signal output from the timer circuit 7. When a binary reproduction signal is present, this switch is connected to a contact b whereby the binary signal is input, and when the binary reproduction signal is absent, this switch is connected a contact a whereby a reference clock signal is input. That is, on the recording medium 1, there is a region on which no information is recorded, and during such a period free of a binary reproduction signal, a reference clock is input to the subsequent PLL circuit, thereby preventing the binary reproduction signal from being drawn to another frequency. Reference numeral 13 designates a phase comparator, reference numeral 14 denotes a low-pass filter, and reference numeral 15 designates a voltage controlled oscillator (VCO), and a synchronous clock is produced by these. Reference numeral 16 denotes a latch, in which the binary reproduction signal is synchronized with the synchronous clock, whereby a synchronous signal is produced.

Figure 5:
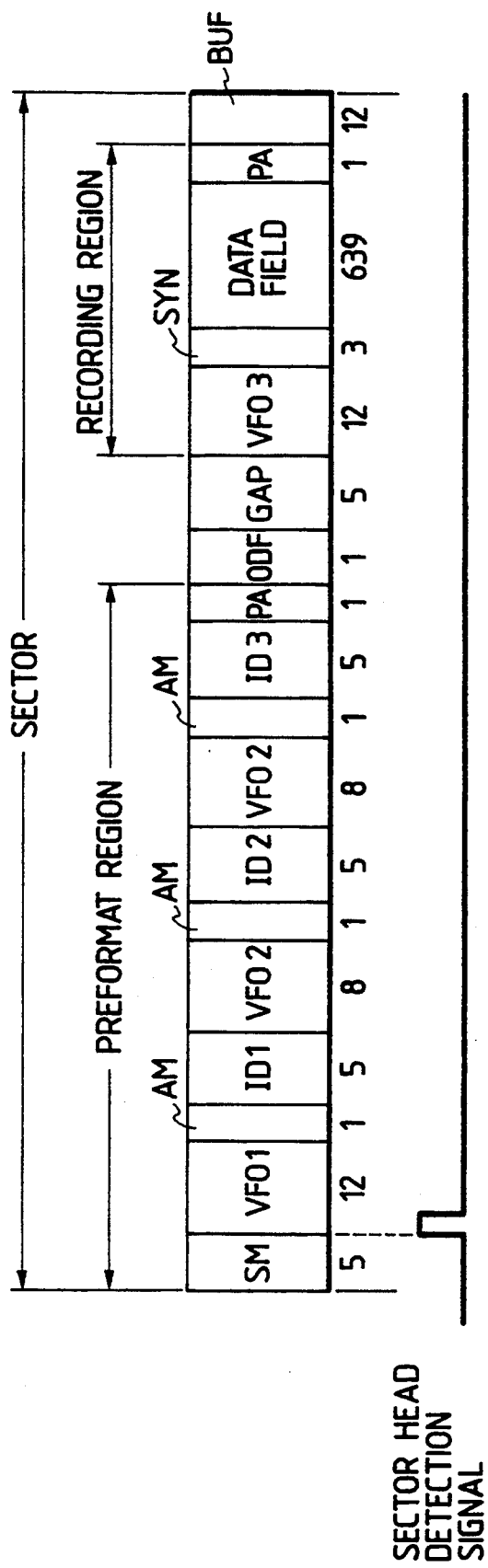
FIG. 5 shows an example of the sector format of a magneto-optical disc used in the apparatus of FIG. 3.

Referring to FIG. 5 which shows the format of a sector of the recording medium 1, a sector is comprised of a preformat region on which chiefly a sector address or the like is pre-recorded and a recording region on which data can be freely recorded. The preformat region is comprised of a sector mark SM indicative of the head of the sector, VFO for drawing in the PLL of the data separator 4, ID on which the sector address is recorded, and an address mark AM indicative of the head position of ID. The recording region is comprised of a data field for recording information thereon, SYN indicative of the head of the data field, etc. ODF, GAP and BUF are regions on which nothing is recorded. In the sector head detection circuit 6 shown in FIG. 3, SM of the preformat region is detected as shown in FIG. 5 to thereby output a sector head detection signal, and in the timer circuit 7, a predetermined time is counted with this detection signal as the starting point to thereby output a PLL gate signal. The PLL gate signal of the timer circuit 7 will be described later in detail.

Figure 6:
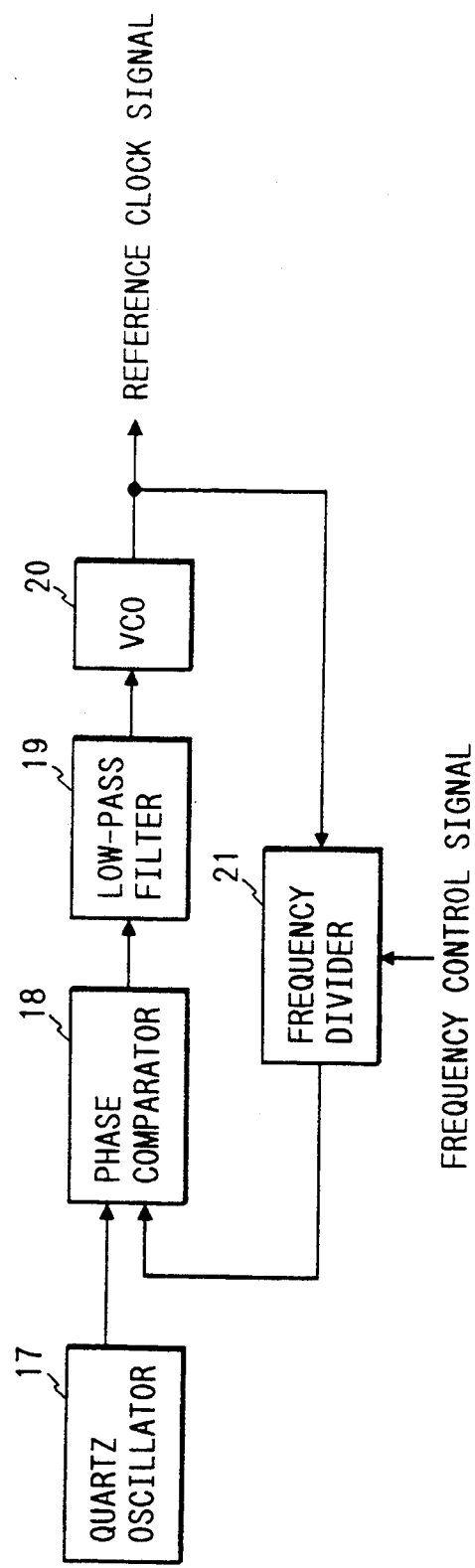
FIG. 6 is a block diagram showing an example of the construction of the synthesizer of FIG. 3.

Referring now to FIG. 6 which is a block diagram specifically showing the construction of the synthesizer 9 shown in FIG. 3, reference numeral 17 designates a quartz oscillator for generating a signal of a reference frequency. Reference numeral 18 denotes a phase comparator, reference numeral 19 designates a low-pass filter, reference numeral 20 denotes a VCO, and reference numeral 21 designates a frequency divider, and there is constructed a clock generating circuit using a PLL circuit. The quartz oscillator 17 generates a predetermined clock of a frequency of a value obtained by dividing a reproduction signal clock frequency by the number of sectors per track, and the frequency divider 21 outputs a clock frequency-divided by a numerical value designated by a frequency control signal. For example, if the frequency control signal designates 20, the frequency divider 21 will output a pulse each time 20 clock pulses are input. Accordingly, the synthesizer 9 will output a clock signal of a frequency obtained by multiplying the clock frequency of the quartz oscillator 17 by a numerical value provided by the control signal. The numerical value of the frequency control signal is the number of sectors per track, as previously described, and therefore, by the numerical value of the control signal being changed correspondingly to the zone, the synthesizer 9 outputs a clock signal of a different frequency predetermined for each zone.

Figure 7:
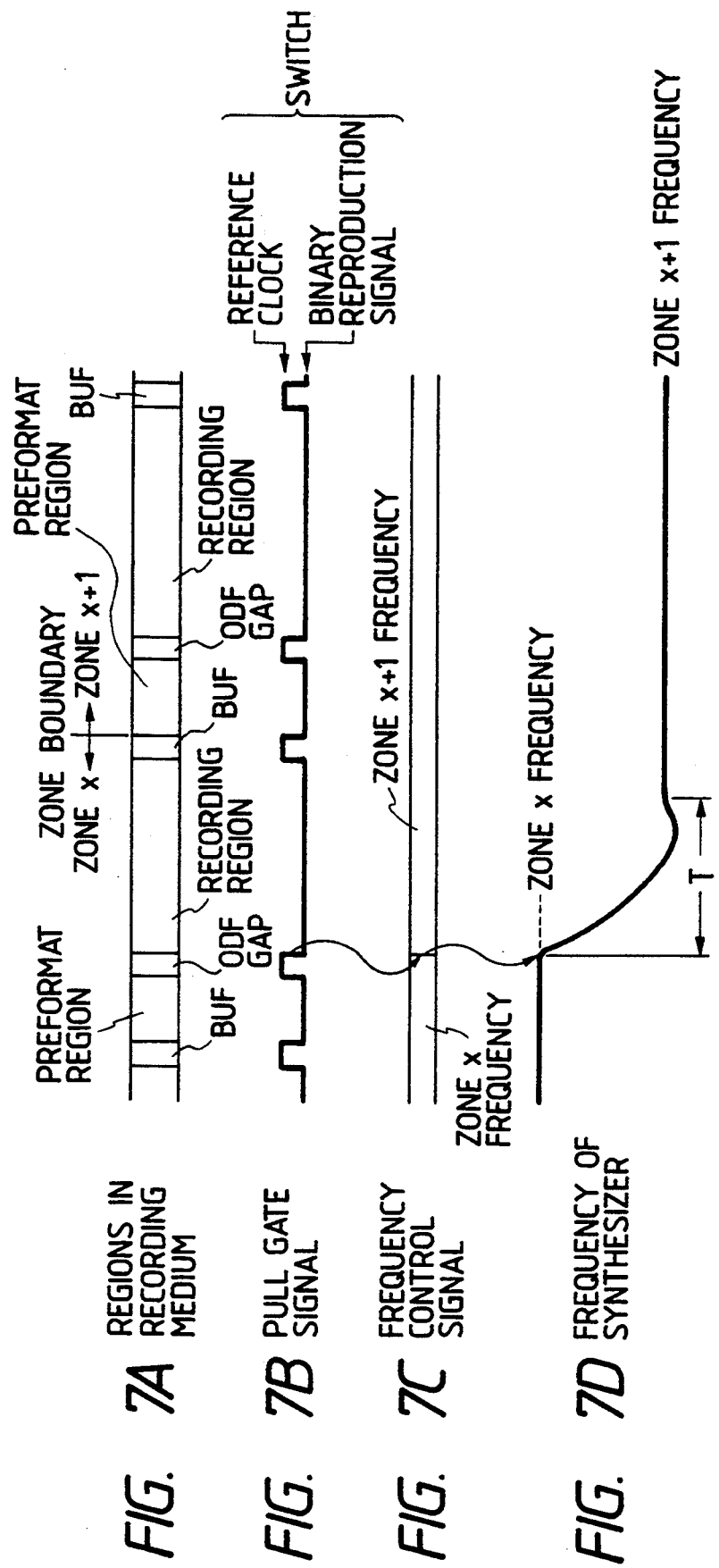
FIGS. 7A-7D are timing charts for illustrating the operation of switching the frequency of a clock signal in the apparatus of FIG. 3.

The operation of the present embodiment will now be described with reference to FIGS. 7A–7D. FIG. 7A shows the regions of the recording medium to be reproduced, and FIG. 7B shows a PLL gate signal produced by the timer circuit 7. When information is to be reproduced, the reproducing light beam of the optical head is scanned on the information tracks of the rotating recording medium 1 and the reflected light thereof is detected by a sensor in the optical head. The detection signal of the sensor is input to the signal detection circuit 2, in which the detection signal is subjected to predetermined signal processing such as photoelectric conversion, whereby a reproduction signal is produced. The thus obtained reproduction signal is binarized by the binarizing circuit 3, whereafter the binary signal is synchronized with the reference clock of the synthesizer 9 by the data separator 4 and is further decoded by the decoding circuit 5, whereby reproduction data and a reproduction clock are produced. Thus, the recorded information on the regions shown in FIG. 7A is subsequently reproduced.

On the other hand, the timer circuit 7 counts the time predetermined with the sector head detection signal detected by the sector head detection circuit 6 as the starting point, and outputs the PLL gate signal as shown in FIG. 7B to the data separator 4. The PLL gate signal is at a high level in BUF region and ODF and GAP regions, and is at a low level in the other regions. In the data separator 4 shown in FIG. 4, when the PLL gate signal is at a high level, the switch 12 is connected to the contact a and the reference clock of the synthesizer 9 is input to the data separator 4. When the PLL gate signal is at a low level, the switch 12 is changed over to the contact b and the binary reproduction signal of the binarizing circuit 3 is input to the data separator 4. Thus, in the data separator 4, the input signal is switched by the PLL gate signal, and during a period during which the binary reproduction signal is absent, the reference clock is input, whereby when the binary reproduction signal is input, the PLL circuit constituting the data separator 4 prevents the binary reproduction signal from being locked to a frequency discrete therefrom. The PLL gate signal produced by the timer circuit 7 is also input to the zone controller 8.

The reproduction data obtained in the decoding circuit 5 is input to the zone controller 8, in which address data is read from this data, whereby the current position being reproduced is recognized. Accordingly, in the zone x of the recording medium 1 shown in FIG. 7A, a frequency control signal corresponding thereto is output to the synthesizer 9 as shown in FIG. 7C, and the synthesizer 9 produces an instruction reference clock and outputs it to the data separator 4. The frequency control signal of the zone controller 8 is a numerical value per track as previously described, and in accordance with this numerical value, the synthesizer 9 produces a reference clock corresponding to the zone x by the operation described in connection with FIG. 6. When it is recognized from the address data that the current position is the last sector of the zone x, the zone controller 8 switches the frequency control signal to a control signal corresponding to the next zone x+1 as shown in FIG. 7C when as shown in FIGS. 7B and 7C, the PLL gate signal is reversed from a high level to a low level in the recording region, that is, when the input signal of the data separator 4 is switched from the reference clock to the binary reproduction signal. As a result, the clock of the synthesizer 9 gradually shifts to the next clock frequency as shown in FIG. 7D, and is stabilized at a clock frequency corresponding to the zone x+1 after the lapse of a time T. On the other hand, the clock switching period of the synthesizer 9 is a period during which the binary reproduction signal is input to the data separator 4 and the reference clock is not used, because the region being reproduced is the recording region of the last sector. Accordingly, no inconvenience will occur even if the frequency of the reference clock is switched in the recording region. The reference clock of the synthesizer 9 is switched to the next frequency before the PLL gate signal before the BUF region at the zone boundary assumes a high level, and in this BUF region, a newly switched reference clock is input to the data separator 4. Of course, in the next zone x+1, predetermined processing is carried out by the use of a new reference clock.

Thus, in the present embodiment, when shift is to be made from the zone x to the next zone x+1 in order to switch the frequency of the reference clock of the synthesizer in the recording region of the last sector of a zone, reproduction can be continuously effected from the last sector of a zone to the head sector of the next zone without the reproducing operation being temporarily discontinued. Accordingly, it becomes possible to effect reproduction continuously over a plurality of zones and the reproduction time can be greatly shortened.

Figure 8:
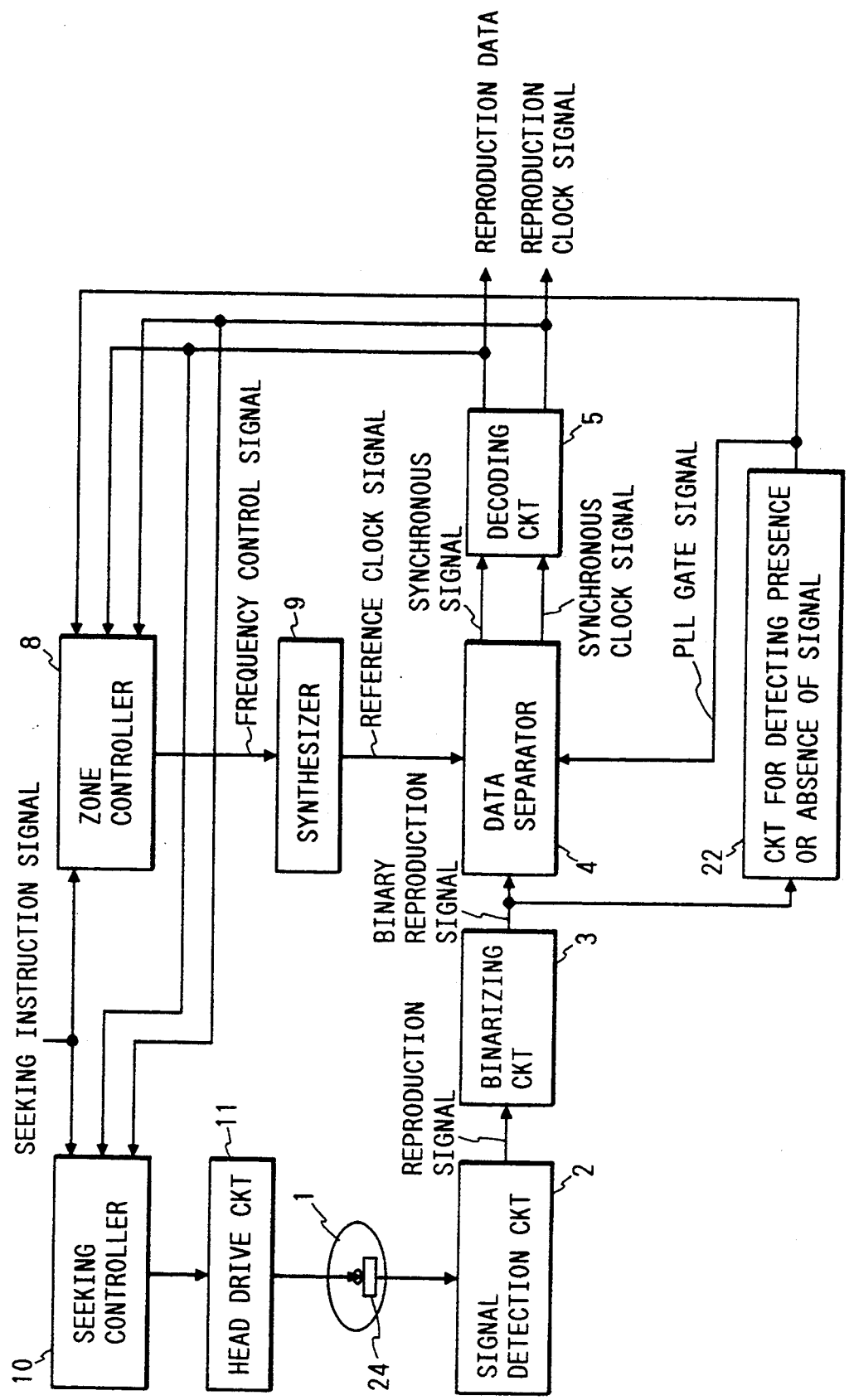
FIG. 8 is a block diagram showing a second embodiment of the data reproducing apparatus of the present invention.
Figure 9:
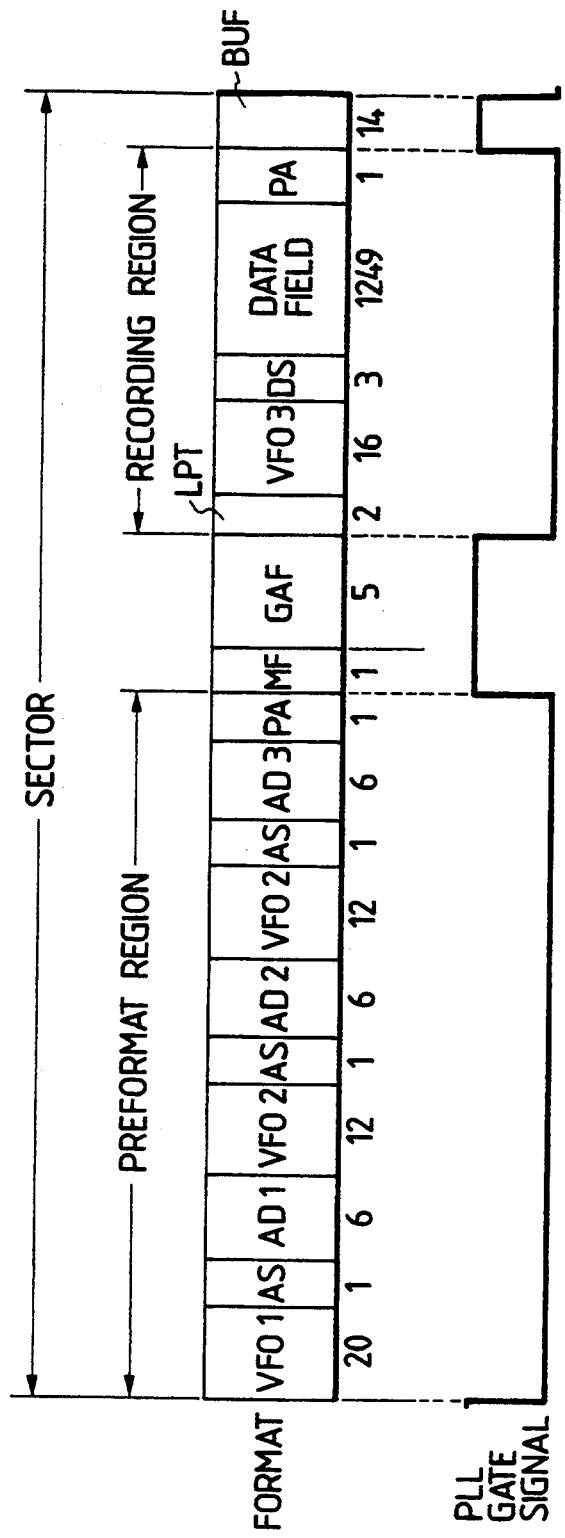
FIG. 9 shows the sector format and PLL gate signal of a magneto-optical disc used in the apparatus FIG. 8.

FIG. 8 is a block diagram showing a second embodiment of the data reproducing apparatus of the present invention. This embodiment is one to be applied in a case where the sector mark SM is absent in the preformat region of the recording medium 1. In FIG. 8, reference numeral 22 designates a circuit for detecting the presence or absence of a signal which monitors the binary reproduction signal obtained in the binarizing circuit 3 and produces a PLL gate signal. In the other points, the construction of this embodiment is the same as the construction of the FIG. 3 embodiment. In the circuit 22 for detecting the presence or absence of a signal, the first binary reproduction signal is detected to thereby detect the head of the preformat region or the recording region, and on the basis thereof, a PLL gate signal is produced as shown in FIG. 9. The thus obtained PLL gate signal is sent to the data separator 4 and zone controller 8, and in the zone controller 8, as in the FIG. 3 embodiment, on the basis of this PLL gate signal, control is effected so as to switch the frequency of the reference clock os the synthesizer 9 in the recording region of the last sector of a zone.

Figure 10:
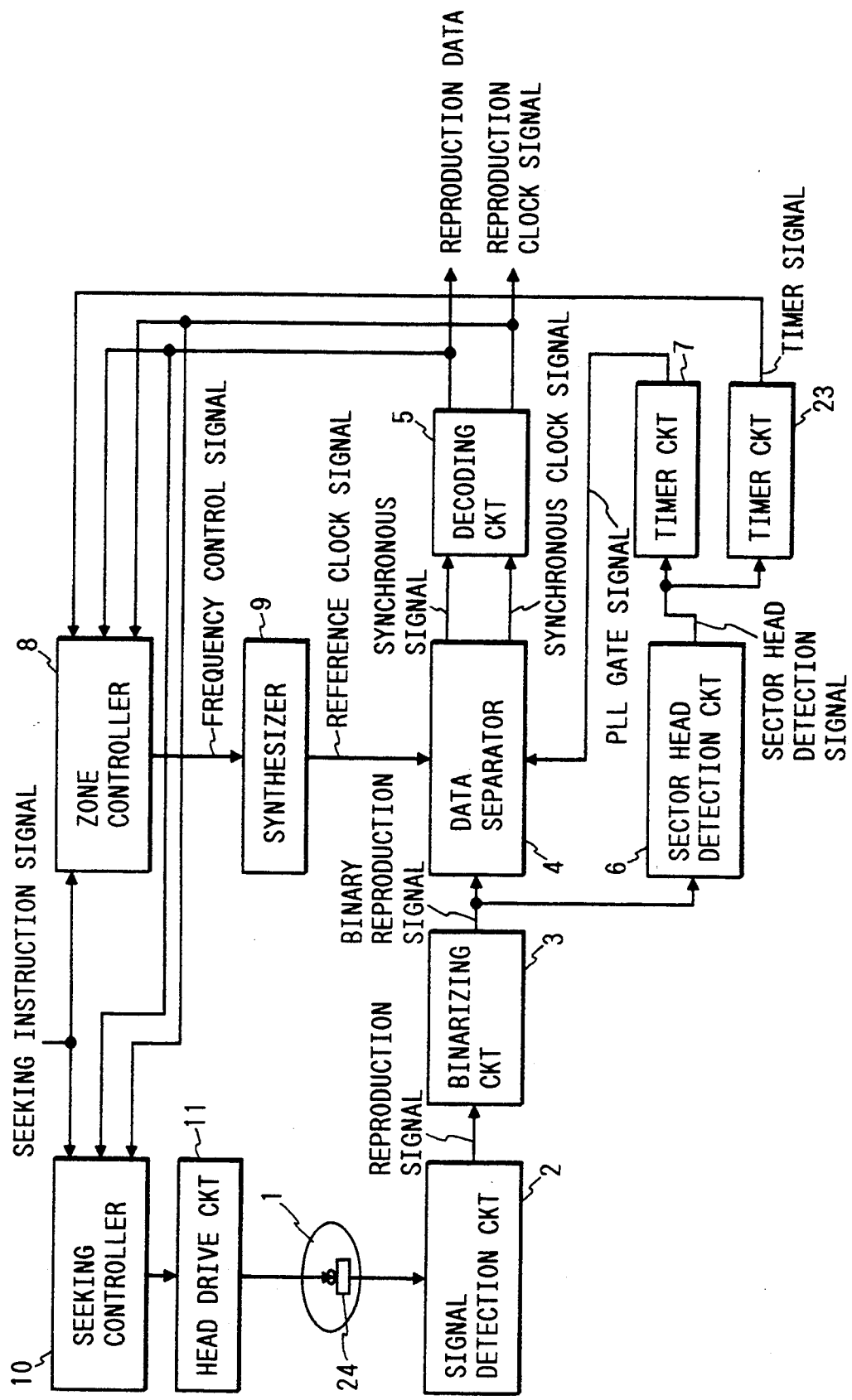
FIG. 10 is a block diagram showing a third embodiments of the data reproducing apparatus of the present invention.
Figure 11:
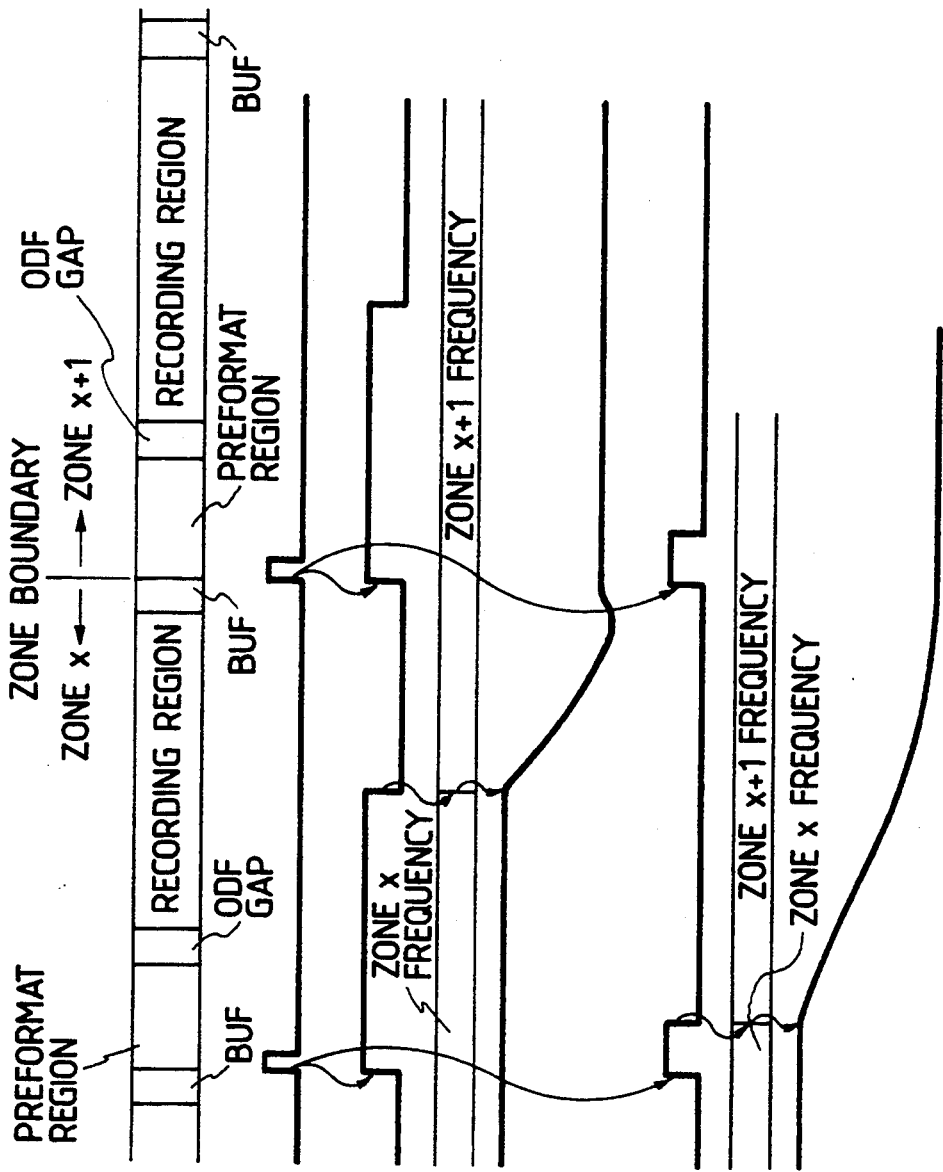
FIGS. 11A-11H are timing charts for illustrating the operation of switching the frequency of a clock signal in the apparatus of FIG. 10.

FIG. 10 is a block diagram showing a third embodiment of the data reproducing apparatus of the present embodiment. In FIG. 10, members identical to those in FIG. 3 are given identical reference numerals and need not be described in detail. In the embodiment of FIG. 3, the zone controller 8 controls the switching of the frequency of the synthesizer 9 by the use of the PLL gate signal, while the present embodiment is one in which a timer circuit exclusively for frequency control is provided so as to control the switching of the frequency. In FIG. 10, reference numeral 23 denotes a timer circuit for controlling the switching of the frequency. This timer circuit 23 counts a predetermined time with a sector head detection signal as the starting point, thereby producing a signal for frequency control. FIGS. 11A–11H are time charts showing the signals of the various portions of the present embodiment. FIG. 11A shows the regions of the recording medium, and FIG. 11B shows the sector head detection signal detected by the sector head detection circuit 6. The timer circuit 23 counts a predetermined time with this detection signal as the starting point, and outputs a timer signal as shown in FIG. 11C. The zone controller 8 switches the frequency control signal to the control signal of the next zone x+1 as shown in FIG. 11D at a point in time at which the timer signal falls to a low level, i.e., halfway of the recording region of the last sector of the zone x. As a result, the frequency of the clock of the synthesizer 9 shifts to the frequency of the next zone as shown in FIG. 11E, and is stabilized at the frequency of the next zone x+1 in the zone boundary.

Also, when some time is required for the switching of the frequency of the synthesizer 9, the timing of the falling of the timer signal can be set in conformity therewith as shown in FIG. 11F. In this case, the zone controller 8 switches the frequency control signal at the timing of the falling of the timer signal as shown in FIG. 11G, and the frequency of the clock of the synthesizer 9 is gently switched to the frequency of the next zone as shown in FIG. 11H. In the present embodiment, the timer circuit exclusively for frequency control is provided and therefore, the setting of the timing of frequency switching becomes free and the timing of the switching can be arbitrarily set in conformity with the response characteristic of the synthesizer.

Figure 12:
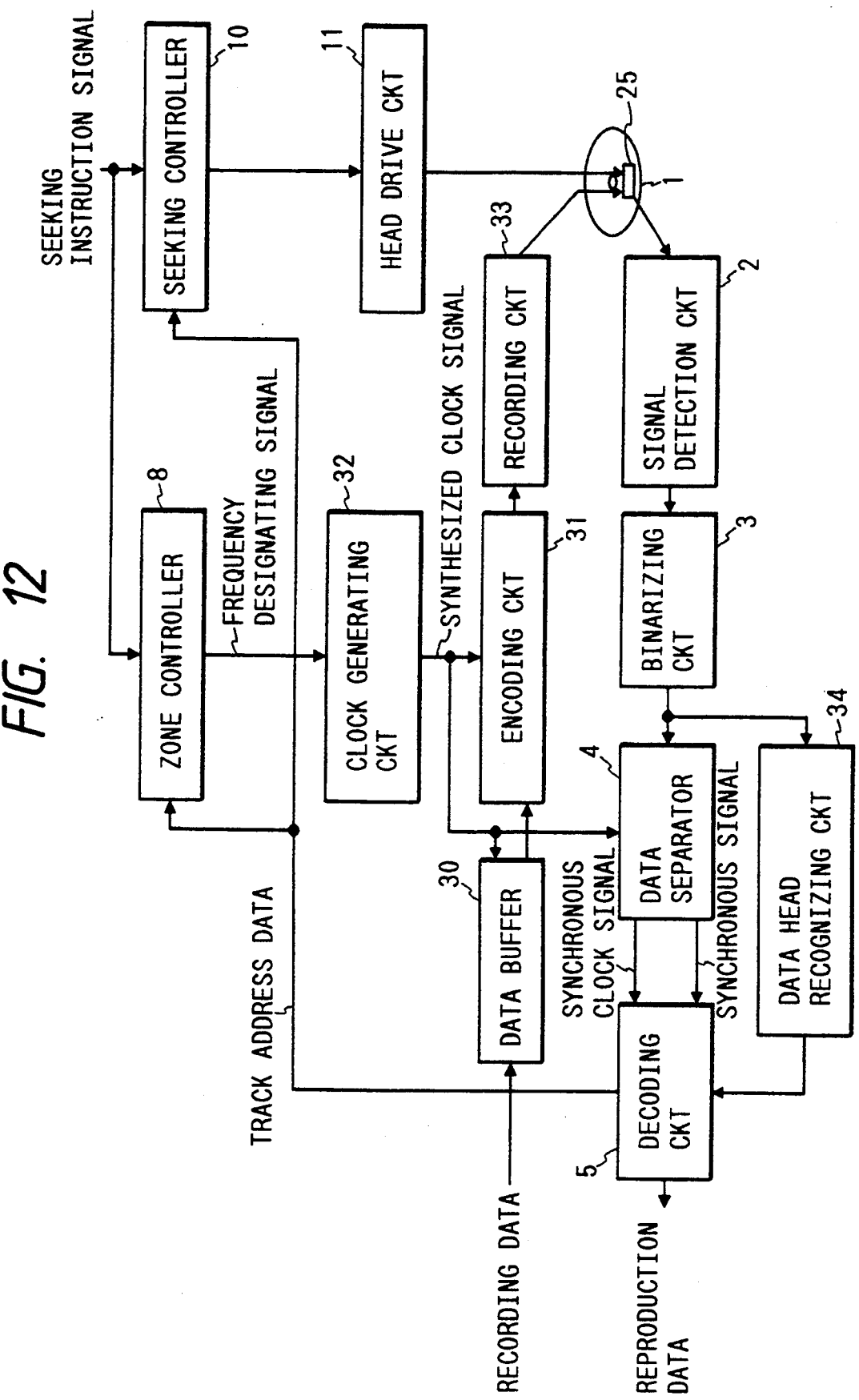
FIG. 12 is a block diagram showing an embodiment of the data recording and reproducing apparatus of the present invention.

FIG. 12 is a block diagram showing an embodiment of the data recording-reproducing apparatus of the present invention. In FIG. 12, members functionally similar to those in the embodiment of FIG. 3 are given similar reference numerals. In FIG. 12, reference numeral 30 designates a data buffer for temporarily storing recording data therein, and reference numeral 31 denotes an encoding circuit for encoding the recording data. Reference numeral 32 designates a clock generating circuit for generating synthesized clocks corresponding to the plurality of zones of the recording medium 1 on the basis of the instructions of the zone controller 8. The specific construction of this clock generating circuit 32 will be described later in detail. The synthesized clocks of the clock generating circuit 32 are output to the data buffer 30, and the recording data accumulated in the data buffer 30 are output to the encoding circuit 31 in synchronism with the synthesized clocks. In the encoding circuit 31, the recording data are encoded, for example, by codes (2, 7) or codes (1, 7), and if required, an error correction code is added thereto and output to a recording circuit 33. In this case, the recording position is indicated by a seeking instruction signal from a control circuit, not shown, and on the basis of these instructions, the seeking controller 8 controls the head drive circuit 11 to move the optical head 25 radially of the medium 1 and cause it to seek the indicated position. Also, the zone controller 8 instructs the clock generating circuit 32 to set the clock to the frequency of a clock corresponding to a zone to which the designated recording position belongs. Thus, the seeking of the optical head 25 and the setting of the clock frequency are effected, and the recording data are recorded at the designated position on the recording medium 1 by the recording circuit 33.

Reference numeral 2 designates a signal detection circuit, reference numeral 3 denotes a binarizing circuit, reference numeral 4 designates a data separator, and reference numeral 5 denotes a decoding circuit, and these are the same as those in the embodiment of FIG. 3. Reference numeral 34 designates a data head recognizing circuit for recognizing the head of data in each recording block as by the detection of a synchronous mark. When information is to be reproduced, the optical head 25 is sought to a position to be reproduced by a seeking instruction signal, and the frequency of the clock of the clock generating circuit 32 is set to a frequency corresponding to a zone to which the designated reproducing position belongs. The recorded information on the recording medium 1 is reproduced and binarized by the signal detection circuit 2 and the binarizing circuit 3, respectively, whereafter it is sent to the data separator 4, in which the binary reproduction signal is synchronized with the synthesized clock of the clock generating circuit 32. The synchronous signal obtained in the data separator 4 is decoded by the decoding circuit 5 by the use of the synchronous clock and the data head recognition signal, and is output as reproduction data and track address data.

FIG. 13 is a block diagram showing a specific example of the clock generating circuit 32. In FIG. 13, reference numeral 35 designates a quartz oscillator for generating a quartz clock of a predetermined frequency, and reference numerals 36 and 37 denote synthesizers for generating synthesized clocks of different frequencies. The construction of these synthesizers 36 and 37 is the same as that shown in FIG. 6. Reference numeral 38 designates a synthesizer controller for outputting to the synthesizers 36 and 37 a signal for indicating the synthesized clock frequency ratio to the quartz clock, and controlling the clock frequencies of the synthesizers 36 and 37. Reference numeral 39 denotes a selector for selecting the synthesized clock of one of the synthesizers 36 and 37 on the basis of the instructions of the controller 38. Also, "1" and "0" are input as fixed signals to the frequency dividing ratio input terminal of the synthesizer 36 and the frequency dividing ratio input terminal of the synthesizer 37, respectively, and the frequency divider of the synthesizer 36 and the frequency divider of the synthesizer 37 are set so as to divide the frequency at an odd frequency dividing ratio and an even frequency dividing ratio, respectively. The synthesizer controller 38 outputs a frequency dividing ratio corresponding to the current zone and a frequency dividing ratio corresponding to the next zone to the frequency dividing ratio input terminals, respectively, of the synthesizers 36 and 37, and the synthesizers 36 and 37 multiply the quartz clock frequency by an integer at the instruction frequency dividing ratios and output synthesized clocks, respectively. That is, the synthesizers 36 and 37 output the synthesized clock of the current zone and yet prepare the synthesized clock of the next zone and wait, and when the zone boundary is reached, the synthesized clock of the current zone is switched to the synthesized clock of the next zone by the selection by the selector 39. The selector 39 is adapted to select one of the synthesizers 36 and 37 by a select signal input thereto from the LSB terminal of the controller 38, and here, when the select signal is "0" the synthesizer 37 is selected, and when the select signal is "1" the synthesizer 36 is selected FIG. 14 collectively shows the relations among the instruction value of the frequency dividing ratio output from the synthesizer controller 38 to the synthesizers 36 and 37, the actual frequency dividing ratio of each synthesizer and the frequency dividing ratio of the selected synthesizer. In the present embodiment, it is to be understood that the zone controller 8 outputs the number of sectors per track as a frequency instruction signal to the synthesizer controller 38. The number of sectors per track shown in FIG. 14 is this instruction value. Also, in FIG. 14, there is shown each dividing ratio when the zone to be recorded or reproduced is switched from the inner periphery toward the outer periphery of the recording medium 1. Accordingly, the number of sectors per track increases by one each toward the outer periphery. When information is to be recorded or reproduced, the zone controller 8 recognizes the current zone from the track address data, and outputs the number of sectors per track in that zone as a frequency instruction signal to the synthesizer controller 38. For example, when as shown in FIG. 14, the number of sectors per track is 20, the synthesizer controller 38 outputs 20 as the instruction value of the frequency dividing ratio to the synthesizer 36, and outputs 20 plus 1, i.e., 21, as the instruction value of the frequency dividing ratio to the synthesizer 37. In the synthesizers 36 and 37, as previously described, odd and even frequency dividing ratios are set, respectively, and thus, as shown in FIG. 14, the frequency dividing ratio of the synthesizer 36 is 21 and the frequency dividing ratio of the synthesizer 37 is 20. At this time, a select signal "0" is output from the LSB terminal of the synthesizer controller 38 to the selector 39, whereby the selector 39 selectively outputs the clock of the synthesizer 37. The obtained senthesized clock of a frequency ratio 20 times is sent to the data buffer 30 and the encoding circuit 31 or the data separator 4, as previously described. On the other hand, the synthesized clock of a frequency ratio 21 times using the dividing ratio 21 of the synthesizer 36 remains input to the selector 39, which thus waits.

In this manner, the synthesized clock is generated in the clock generating circuit 32, and when the optical head moves toward the outer periphery and arrives at the boundary with the next zone, the synthesizer controller 38 switches the select signal of the LSB terminal to "1", whereby the selector 39 selectively outputs the synthesized clock of the other synthesizer 36. At the same time, the synthesizer controller 38, as shown in FIG. 14, outputs the instruction value of a frequency dividing ratio corresponding to the next zone to the synthesizers 36 and 37, and the synthesizer 36 sets the frequency dividing ratio to 21 and the synthesizer 37 sets the frequency dividing ratio to 22 necessary for the next zone. Thereby, in the zone boundary, switching is effected to the synthesized clock of the synthesizer 36 and the other synthesizer 37 is set to the synthesized clock necessary for the next zone. Also, when the next zone boundary is arrived at, the dividing ratio is switched by a similar operation and thereafter, the switching control of the frequency of the clock is likewise effected in each zone boundary.

As described above, in the present embodiment, when the clock frequency is to be switched correspondingly to a zone, the selector simply switches the clock frequency to the clock of the synthesizer which has already generated a clock for the next zone and is waiting and therefore, independently of the response speed of the synthesizers, the frequency of the synthesized clock can be quickly switched to the frequency of the next zone. Accordingly, in the zone boundaries, recording and reproduction can be effected in continuation to the next zone without one full rotation of the disc being waited for as has heretofore been done, and the speeds of recording and reproduction can be made remarkably higher. When the synthesizer controller is to indicate the frequency dividing ratio to each synthesizer, it indicates to one synthesizer the instruction value of the other synthesizer plus 1, and as the method of indicating in this manner, there is a method of adding by the use of a digital adder, a method of effecting addition by a counter, or a method using a read only memory (ROM) or a central processing unit (CPU).

Conversely, FIG. 15, shows the dividing ratios when the zone is changed over in a disc apparatus for recording and reproducing data from the outer periphery toward the inner periphery of the recording medium 1. Accordingly, here, the number of sectors per track decreases by one each from the outer periphery toward the inner periphery. When the recording or reproduction of information is to be effected from the outer periphery toward the inner periphery, the synthesizer controller 38, as shown in FIG. 15, indicates to the synthesizer 37 the current number of sectors per track as a dividing ratio, and outputs to the synthesizer 36 a numerical value obtained by subtracting 1 therefrom as a frequency dividing ratio. For example, if the number of sectors per track is 40, 40 is output to the synthesizer 37 and 39 is output to the synthesizer 36. Also, the selector 39 selects the synthesizer 36 when the select signal from the synthesizer controller 38 is "1", and selects the synthesizer 37 when the select signal from the synthesizer controller 38 is "0". Accordingly, when as shown in FIG. 15, the number of selectors per track is 40, the synthesized clock of the synthesizer 37 is selectively output, and in the zone boundary, the selector 39 selects the synthesized clock of the synthesizer 36 by a select signal, whereby switching is effected to a frequency corresponding to the next zone. Even when recording or reproduction is to be thus effected from the outer periphery toward the inner periphery, the synthesizers 36, 37 and selector 39 are controlled as shown in FIG. 15, whereby recording or reproduction over a plurality of zones can be continuously effected.

Figure 16:
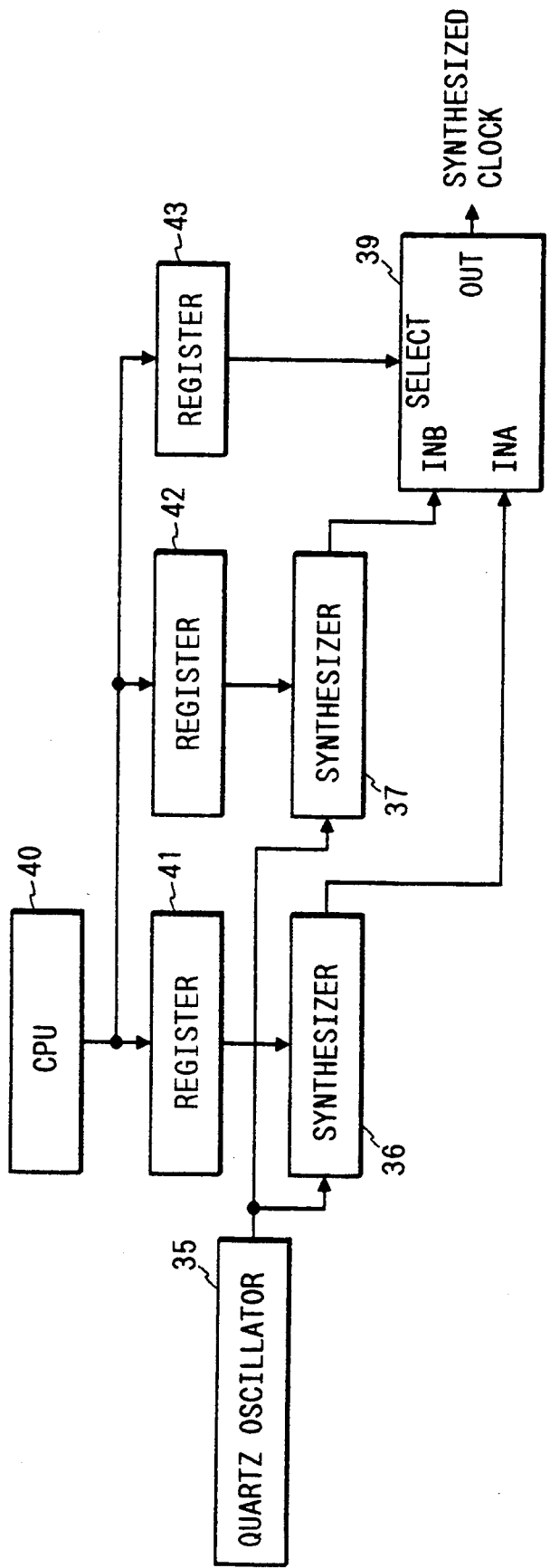
FIG. 16 is a block diagram showing another example of the construction of the clock generating circuit of FIG. 12.

FIG. 16 is a circuit diagram showing another embodiment of the clock generating circuit 32. In FIG. 16, reference numeral 40 designates a CPU, and reference numerals 41–43 denote registers. Reference numeral 35 designates a quartz oscillator, reference numerals 36 and 37 denote synthesizers, reference numeral 39 designates a selector, and these are the same as those in the embodiment of FIG. 13. In this embodiment, by the CPU 40, the currently 10 necessary clock frequency is communicated to the register 41, the next necessary clock frequency is communicated to the register 42, and which of the clocks of the synthesizers 36 and 37 should be selected is communicated to the register 43. Accordingly, in the synthesizers 36, 37 and 39, the generation of clocks and the selection of the clocks are effected on the basis of these instructions, and as in the embodiment of FIG. 13, the switching control of the clock frequency for each zone is effected.

Figure 17:
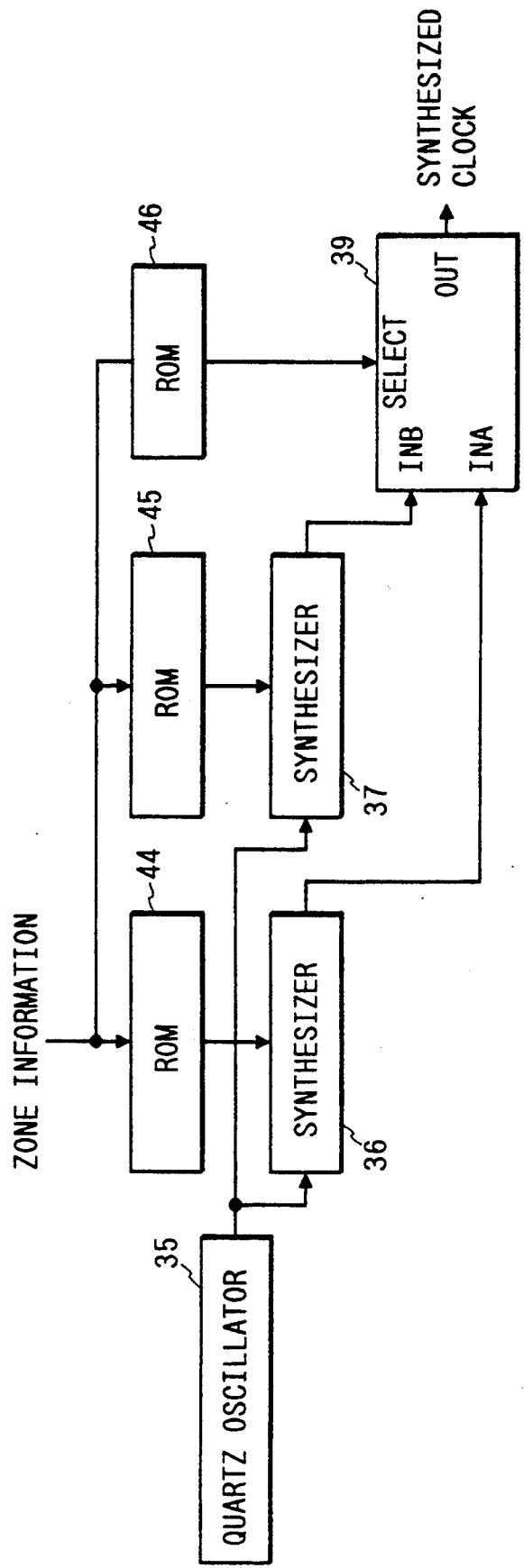
FIG. 17 is a block diagram showing still another example of the construction of the clock generating circuit of FIG. 12.

FIG. 17 is a block diagram showing still another embodiment of the clock generating circuit 32. In FIG. 17, reference numerals 44–46 designate ROMs. In this embodiment, frequencies to be output in all zones by the synthesizers 36 and 37 are stored in advance in the ROMs 44 and 45, and information regarding which synthesizer should be selected in each zone is stored in the ROM 46. The current zone information is sent from the zone controller to these ROMs 44–46, and the synthesizers 36 and 37 are controlled to a frequency corresponding to the zone by the zone information and frequency information stored in the ROMs 44 and 46. The current zone information is also sent to the ROM 46, and the selector 39 selects a synthesizer corresponding to the zone by the selector information of 10 the ROM 46, whereby the switching control of the clock frequency for each zone is effected.

As described above, in the embodiment of FIGS. 16 and 17 as well, the currently necessary clock for each zone is output, and yet the necessary clock for the next zone is prepared and therefore, as in the embodiment of FIG. 13, the clock can be momentarily switched to the next clock frequency in the zone boundary. Also, the embodiment of FIG. 13 has been described with respect to an example in which the number of sectors per track increases or decreases by one each, but the embodiments of FIGS. 16 and 17 can be effectively used when the number of sectors per track increases or decreases more irregularly. In this embodiments of FIGS. 13, 16 and 17, the quartz clock of the quartz oscillator is frequency-divided by each synthesizer, but where there is no multiple proportion relation between the transfer speeds of the zones, discrete quartz oscillators can be provided.

As described above, in the present invention, the switching of the clock frequency is instructed to the clock generating means to switch the clock frequency in the data block before the zone boundary, and switches the clock signal during the period during which the head scans the recording region in the last data block in the zone boundary, whereby at the head of the next zone, the clock signal is stabilized at a frequency corresponding to that zone, and the reproduction of the data over a plurality of zones can be continuously effected. Accordingly, the wasteful time required for waiting for one full rotation of the disc at the head of the next zone as in the prior art need not occur and therefore, the data reproducing time can be greatly shortened.

Also, two clock generating means are provided to generate the currently necessary clock signal and the clock signal necessary for the next zone, and the currently necessary clock signal is switched to the clock signal of the next zone waiting in the zone boundary, whereby independently of the response characteristic of the clock generating means, the clock frequency can be quickly switched to the frequency of the next zone. Accordingly, the clock frequency is momentarily switched in the zone boundary and therefore, recording and reproduction over a plurality of zones can be continuously effected and the recording and reproducing speeds can be made remarkably higher than in the prior art.

What is claimed is:

1. An apparatus for reproducing data from a disc-like recording medium having a plurality of zones divided radially thereof, different frequencies being set for said zones, each of said zones comprising a plurality of data blocks arranged in a predetermined order, the data blocks in each of said zones having signals recorded at a set frequency thereon, said apparatus comprising:
   a head for scanning the data blocks while moving radially over the medium, and for reading out the recorded signals:
   a clock generating circuit for generating a clock signal of a frequency set for the zone to which the data block being scanned by said head belongs;
   a reproducing circuit for reproducing data from the signal read out by the head, on the basis of the clock signal generated by said clock generating circuit;
   a detection circuit for detecting, when said head reads out the signals over two contiguous zones, the head position of the last data block of the zone from which the signals are read out earlier, and for outputting a detection signal; and
   a control circuit responsive to the detection signal output from said detection circuit to instruct said clock generating circuit to change the frequency of the clock signal, wherein the change of the frequency of the clock signal in said clock generating circuit is completed before said head reaches a boundary between zones.

2. An apparatus according to claim 1, wherein the data blocks comprise sectors having a sector mark recorded at the head thereof, and said detection circuit comprises a circuit for detecting the sector mark from the signal read out by said head.

3. An apparatus according to claim 1, wherein the data blocks comprise a preformat region having a sector address recorded thereon, a recording region having a data signal recorded thereon, a gap region disposed between the preformat region and the recording region and having no signal recorded thereon, and a buffer region disposed behind the recording region and having no signal recorded thereon, and wherein said control circuit instructs said clock generating circuit to change the frequency of the clock signal when said head begins to scan the recording region of the last one of the data blocks.

4. An apparatus according to claim 1, wherein said control circuit instructs said clock generating circuit to change the frequency of the clock signal after a predetermined time has passed from a point in time at which the detection signal is output from said detection circuit.

5. An apparatus according to claim 4, wherein the data blocks comprise a preformat region having a sector address recorded thereon, a recording region having a data signal recorded thereon, a gap region disposed between the preformat region and the recording region and having no signal recorded thereon, and a buffer region disposed rearwardly of the recording region and having no signal recorded thereon, and wherein said control circuit comprises a timer circuit for outputting a gate signal indicative of a first level when said head is scanning the preformat region and recording region, and for outputting a gate signal indicative of a second level when said head is scanning the gap region, and the buffer region, on the basis of the detection signal output from said detection circuit, and a controller for instructing said clock generating circuit to change the frequency of the clock signal on the basis of said gate signal.

6. An apparatus according to claim 5, wherein said controller instructs said clock generating circuit to change the frequency of the clock signal when the gate signal varies from the second level to the first level as said head scans the gap region to the recording region.

7. An apparatus according to claim 5, wherein said reproducing circuit comprises a data separator for selectively receiving as an input the signal read out by said head and the clock signal and for outputting a synchronized signal, and a decoding circuit for reproducing data from the synchronized signal, said data separator having a switch circuit controlled by the gate signal, causing the signal read out by said head to be input thereto when the gate signal is at the first level, and causing the clock signal to be input thereto when the gate signal is at the second level.

8. An apparatus according to claim 1, wherein said clock generating circuit comprises a voltage controlled oscillator for outputting the clock signal, a frequency divider for frequency-dividing the clock signal on the basis of a frequency indicated from said control circuit, a reference oscillator for generating a reference frequency signal, a phase comparator for comparing the phase of the reference frequency signal with the phase of the signal frequency-divided by said frequency divider, and for outputting a comparison signal, and a low-pass filter for filtering the comparison signal and feeding back it to said voltage controlled oscillator.

9. An apparatus according to claim 1, wherein the data blocks comprise a preformat region having a sector address recorded thereon, a recording region having a data signal recorded thereon, a gap region disposed between the preformat region and the recording region and having no signal recorded thereon, and a buffer region disposed rearwardly of the recording region and having no signal recorded thereon, wherein said detection circuit comprises a circuit for detecting the presence or absence of a signal which detects the presence or absence of the signal read out by said head, and for outputting a gate signal indicative of a first level when said head is scanning the preformat region and recording region, and for outputting a gate signal indicative of a second level when said head is scanning the gap region and buffer region, and wherein said control circuit comprises a controller for instructing said clock generating circuit to change the frequency of the clock signal on the basis of the gate signal.

10. An apparatus according to claim 9, wherein said controller instructs said clock generating circuit to change the frequency of the clock signal when the gate signal varies from the second level to the first level as said head scans the gap region to the recording region.

11. An apparatus according to claim 1, wherein the data blocks comprise a preformat region having a sector address recorded thereon, a recording region having a data signal recorded thereon, a gap region disposed between the preformat region and the recording region and having no signal recorded thereon, and a buffer region disposed rearwardly of the recording region and having no signal recorded thereon, and wherein said control circuit comprises a first timer circuit for outputting a gate signal indicative of a first level when said head is scanning the preformat region and recording region, and for outputting a gate signal indicative of a second level when said head is scanning the gap region and buffer region, on the basis of the detection signal output from said detection circuit, a second timer circuit for outputting a timer signal after a predetermined time has passed from a point in time at which the detection signal is output from said detection circuit, and a controller for instructing said clock generating circuit to change the frequency of the clock signal on the basis of the timer signal.

12. An apparatus according to claim 11, wherein said reproducing circuit comprises a data separator for selectively receiving as an input the signal read out by said head and the clock signal, and for outputting a synchronized signal, and a decoding circuit for reproducing data from the synchronized signal, said data separator having a switch circuit controlled by the gate signal, causing the signal read out by said head to be input thereto when the gate signal is at the first level, and causing the clock signal to be input thereto when the gate signal is at the second level.

13. A method of reproducing data from a disc-like recording medium having first and second zones divided radially thereof, each of the first and second zones comprising a plurality of data blocks arranged in a predetermined order, the data blocks of the first and second zones having first and second signals recorded at first and second frequencies thereon, respectively, comprising the steps of:

scanning the data blocks in the first zone with a head while moving the head radially over the medium, and reading out the recorded first signal;

generating a clock signal of a first frequency from a clock generating circuit;

reproducing data from the first signal read out by the head, on the basis of the clock signal of the first frequency generated by the clock generating circuit;

detecting the head position of the last data block in the first zone, and obtaining a detection signal;

changing the frequency of the clock signal generated by the clock generating circuit from the first frequency to a second frequency in response to the detection signal, wherein the change of the frequency of the clock signal in the clock generating circuit is completed before the head reaches a boundary between the first zone and the second zone;

scanning the data blocks in the second zone and reading out the recorded second signal; and reproducing data from the second signal read out by the head, on the basis of the clock signal of the second frequency generated by the clock generating circuit.

14. A method according to claim 13, wherein the data blocks comprise sectors having a sector mark recorded at the head thereof, and said step of obtaining the detection signal comprises the step of detecting the sector mark from the signal read out by the head.

15. A method according to claim 13, wherein the data blocks comprise a preformat region having a sector address recorded thereon, a recording region having a data signal recorded thereon, a gap region disposed between the preformat region and the recording region and having no signal recorded thereon, and a buffer region disposed rearwardly of the recording region and having no signal recorded thereon, and wherein said changing step comprises the step of instructing the clock generating circuit to change the frequency of the clock signal from the first frequency to the second frequency when the head begins to scan the recording region of the last one of the data blocks.

16. A method according to claim 13, wherein said step of generating the clock signal of the second frequency comprises the step of instructing the clock generating circuit to change the frequency of the clock signal from the first frequency to the second frequency after a predetermined time has passed from a point of time at which the detection signal is output.

17. An apparatus for recording and/or reproducing data on or from a disc-like recording medium having a plurality of zones divided radially thereof, different frequencies being set for the zones each comprising a plurality of data blocks arranged in a predetermined order, the data blocks in each of the zones having signals recorded at a set frequency thereon, said apparatus comprising:

a head for scanning the data blocks while moving radially over the medium, and for writing signals thereon and/or reading out signals therefrom;

a clock generating circuit for outputting a clock signal, said clock generating circuit comprising first and second clock generators each for generating a clock signal of variable frequency, and a selector for causing the clock signals generated from the first and second clock generators to be selectively outputted;

a signal processing circuit for converting data into a signal to be written by said head and/or for reproducing data from the signal read out by said head, on the basis of the clock signal outputted from said clock generating circuit; and a control circuit for controlling clock generating said circuit such that one of said first and second clock generators generates the clock signal of a frequency set for a zone which is currently scanned by said head and the other of said first and second clock generators generates the clock signal of a frequency set for a zone which is subsequently scanned by said head, wherein said control circuit instructs said selector of said clock generating circuit to switch the clock signal when said head shifts from the data blocks in the zone currently being scanned thereby to the data blocks in another zone, so that the clock signals generated from said first and second clock generators are alternately outputted from said selector.

18. An apparatus according to claim 17, wherein said clock generating circuit comprises a reference oscillator for outputting a clock signal of a reference frequency, and a controller for indicating a frequency dividing ratio of the first and second clock generators, and wherein said first and second clock generators frequency-divide the clock signal of the reference frequency by the frequency dividing ratio indicated from said controller and generate first and second clock signals, respectively.

19. An apparatus according to claim 18, wherein said clock generating circuit further comprises a first memory for storing the frequency of the first clock signal, a second memory for storing the frequency of the second clock signal, and a third memory for storing which of the clock signals should be selected by said selector.

* * * * *

UNITED STATES PATENT AND TRADEMARK OFFICE
CERTIFICATE OF CORRECTION

PATENT NO. : 5,400,309  Page 1 of 2
DATED : March 21, 1995
INVENTOR(S) : SEIICHIRO SATOMURA It is certified that error appears in the above-indentified patent and that said Letters Patent is hereby corrected as shown below:

COLUMN 1

Line 13, "rotating a" should read --a rotating--.
Line 35, "velocity the," should read --velocity, the--.

COLUMN 2

Line 16, "the-zone" should read --the zone--.

COLUMN 5

Line 51, "connected" should read --connected to--.

COLUMN 8

Line 25, "os" should read --of--.

COLUMN 10

Line 36, "selected " should read --selected.--.

UNITED STATES PATENT AND TRADEMARK OFFICE
CERTIFICATE OF CORRECTION

PATENT NO. : 5,400,309  Page 2 of 2
DATED : March 21, 1995
INVENTOR(S) : SEIICHIRO SATOMURA It is certified that error appears in the above-indentified patent and that said Letters Patent is hereby corrected as shown below:

COLUMN 12

Line 22, "10" should be deleted.
Line 46, "10" should be deleted.

Signed and Sealed this

Thirteenth Day of June, 1995

Attest:

BRUCE LEHMAN

Attesting Officer  Commissioner of Patents and Trademarks